(12) United States Patent
Pinarbasi

(10) Patent No.: US 6,728,083 B2
(45) Date of Patent: Apr. 27, 2004

(54) METHOD OF MAKING A SPIN VALVE SENSOR WITH A CONTROLLED FERROMAGNETIC COUPLING FIELD

(75) Inventor: Mustafa Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 316 days.

(21) Appl. No.: 09/892,815

(22) Filed: Jun. 26, 2001

(65) Prior Publication Data

US 2002/0196583 A1 Dec. 26, 2002

(51) Int. Cl.$^7$ .................................... G11B 5/127
(52) U.S. Cl. .................................... 360/324.11
(58) Field of Search ........................... 360/324.11, 321, 360/324.2, 324, 324.1, 313, 317, 319; 324/252; 204/192.11

(56) References Cited

U.S. PATENT DOCUMENTS

| | | | |
|---|---|---|---|
| 5,862,021 A | * 1/1999 | Deguchi et al. | ............ 360/313 |
| 5,976,713 A | 11/1999 | Fuke et al. | ................. 428/692 |
| 6,033,491 A | 3/2000 | Lin | ............................. 148/108 |
| 6,428,657 B1 | * 8/2002 | Pinarbasi | ............... 204/192.11 |

* cited by examiner

*Primary Examiner*—Allen Cao
(74) *Attorney, Agent, or Firm*—Ervin F. Johnston (57) ABSTRACT

A pinned layer structure of a spin valve sensor is formed by sputter deposition of cobalt iron (CoFe) in a nitrogen ($N_2$) atmosphere. This method permits a wider range of deposition times of a copper spacer layer to achieve a desirable ferromagnetic coupling field ($H_F$) between the pinned layer structure and a free layer structure in the spin valve sensor.

37 Claims, 8 Drawing Sheets

FIG. 9
(ABS)

METHOD OF MAKING A SPIN VALVE SENSOR WITH A CONTROLLED FERROMAGNETIC COUPLING FIELD

BACKGROUND OF THE INVENTION

1. Field of the Invention

The present invention relates to a method of making a spin valve sensor with a controlled ferromagnetic coupling field ($H_F$) wherein a pinned layer structure is sputter deposited in such a manner that a desired ferromagnetic coupling field ($H_F$) can be obtained within a wider range of deposition times of a copper spacer layer.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a ferromagnetic coupling field ($H_F$) between the free and pinned layer structures is minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The transfer curve of a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max (V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field ($H_F$) between the pinned layer and the free layer, a net demagnetizing (demag) field ($H_D$) from the pinned layer, a sense current field ($H_I$) from all conductive layers of the spin valve except the free layer and a net image current field ($H_{IM}$) from the first and second shield layers if the sensor is offset between the first and second read gap layers. In order to reduce demagnetizing field from the pinned layer on the free layer, the pinned layer may be an antiparallel (AP) pinned layer structure. An AP pinned layer structure has an antiparallel coupling (APC) layer which is located between ferromagnetic first and second AP pinned layers. The first and second AP pinned layers have magnetic moments which are antiparallel with respect to one another because of the strong antiferromagnetic coupling therebetween. The AP pinned layer structure is fully described in commonly assigned U.S. Pat. No. 5,465,185 which is incorporated by reference herein. Because of the partial flux closure between the first and second AP pinned layers of each first and second AP pinned structures, each AP pinned layer exerts only a small demagnetizing field on the free layer. Because of the small demagnetizing field the exchange coupling between the AP pinned layer structure and the pinning layer is increased for promoting high stability when the spin valve sensor is subjected to unwanted magnetic fields in the presence of elevated temperatures.

The aforementioned dual spin valve sensor includes a ferromagnetic free layer structure between nonmagnetic electrically nonconductive first and second spacer layers which are, in turn, located between ferromagnetic first and second pinned layer structures. The spacer layers are typically copper (Cu) and the pinned layers are typically cobalt iron (CoFe). It has been found that a cobalt iron pinned layer next to a copper spacer layer promotes the magnetoresistive coefficient dr/R of the sensor. The dual spin valve sensor is desirable because its magnetoresistive coefficient dr/R is about 1.5 times greater than the magnetoresistive coefficient dr/R of a single spin valve sensor.

The dual spin valve sensor is also desirable from the standpoint that there is about an equal amount of conductive material on each side of the free layer structure so that the sense current field ($H_I$) acting on the free layer structure is essentially zero. It is also desirable that each of the pinned layer structures in the dual spin valve sensor be an antiparallel (AP) pinned layer structure, as discussed hereinabove. Each of the AP pinned layer structures has a low demagnetizing field and the thicknesses of the AP pinned layers of the AP pinned layer structures can be designed so that these demagnetizing fields have nearly total flux closure. Accordingly, the net demagnetizing field from the first and second AP pinned layer structures can be essentially zero. In a preferred embodiment the dual spin valve sensor is not offset between the first and second read gap layers so that adequate insulation can be provided for preventing shorts between the lead layers of the sensor and the first and second shield layers while maintaining a minimum read gap between the first and second shield layers for promoting linear read bit density. Accordingly, virtually the only magnetic field urging the magnetic moment of the free layer structure from a position parallel to the ABS is a net ferromagnetic coupling field ($H_F$) between each of the first and second AP pinned layer structures and the free layer structure.

In present methods of sputter depositing the copper spacer layers the ferromagnetic coupling field cannot be controlled within a desirable range from 0 to –10 Oe. As an example, when the deposition time for the first copper spacer layer is 26 seconds the ferromagnetic coupling field ($H_F$) is –20 Oe and when the deposition time for the first copper spacer layer is 25 seconds the ferromagnetic coupling field ($H_F$) is +10 Oe. Within a one second deposition time the ferromagnetic coupling field ($H_F$) has a difference of 30 Oe. Because of process variations, it is very difficult to obtain the aforementioned desirable range of 0 Oe to –10 Oe when the range of the ferromagnetic coupling field ($H_F$) is 30 Oe for only one second of copper deposition time. The same problem occurs for a single AP pinned layer structure or a single spin valve sensor with a single pinned layer structure. However, in these embodiments a net sense current field and a net demagnetizing field are present for help in properly biasing the free layer structure.

SUMMARY OF THE INVENTION

The present invention overcomes the aforementioned problem by sputter depositing a cobalt iron (CoFe) pinned layer structure reactively in a nitrogen ($N_2$) atmosphere. It is believed that this process alters the microstructure of the cobalt iron pinned layer structure so that it acts as a seed layer for layers deposited thereon, particularly the copper spacer layer, so as to also alter its microstructure. In a dual spin valve sensor the second AP pinned layer of the first AP pinned layer structure is sputter deposited in the nitrogen atmosphere. With this arrangement a net ferromagnetic coupling field ($H_F$) between 0 Oe to –10 Oe can be obtained with deposition times of the copper spacer layer next to the second AP pinned layer in a range from 26 to 30 seconds. This 4 second range enables present sputter deposition techniques to obtain the desired ferromagnetic coupling field ($H_F$). In the prior art system the desirable range from 0 Oe to –10 Oe could only be obtained between 25.5 to 26 seconds of copper deposition times which is only one-half of a second. The method also applies to single spin valve sensors with an AP pinned layer structure or a single layer pinned layer structure and also to such embodiments with the altered cobalt iron pinned layer structure fabricated according to the present process.

An object of the present invention is to provide a method of making a spin valve sensor wherein a desirable ferromagnetic coupling field ($H_F$) can be obtained with present sputter deposition techniques.

Another object is to provide a method of making a dual AP pinned spin valve sensor wherein a ferromagnetic coupling field from 0 Oe to –10 Oe can be obtained with a wider range of copper deposition times for a spacer layer.

A further object is to provide a spin valve sensor wherein a cobalt iron pinned layer structure is altered by the aforementioned methods of making.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
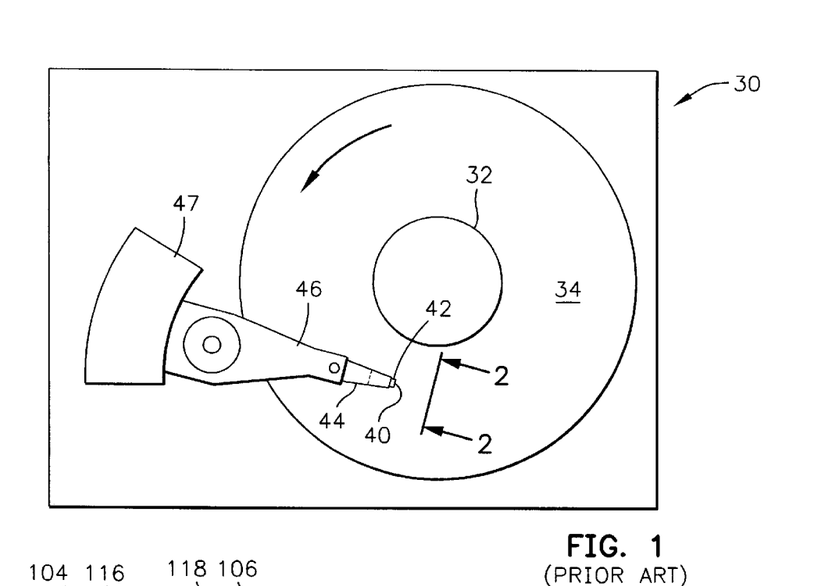
FIG. 1 is a plan view of an exemplary magnetic disk drive.
Figure 2:
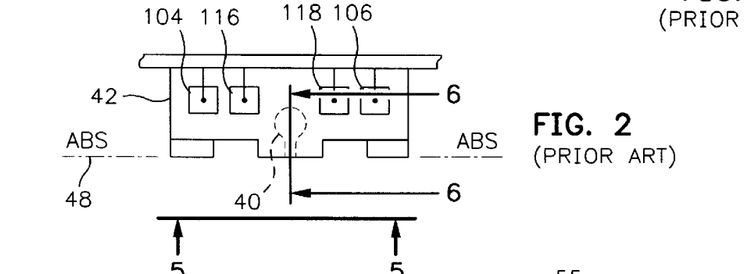
FIG. 2 is an end view of a slider with a magnetic head of the disk drive as seen in plane 2—2 of FIG. 1.
Figure 3:
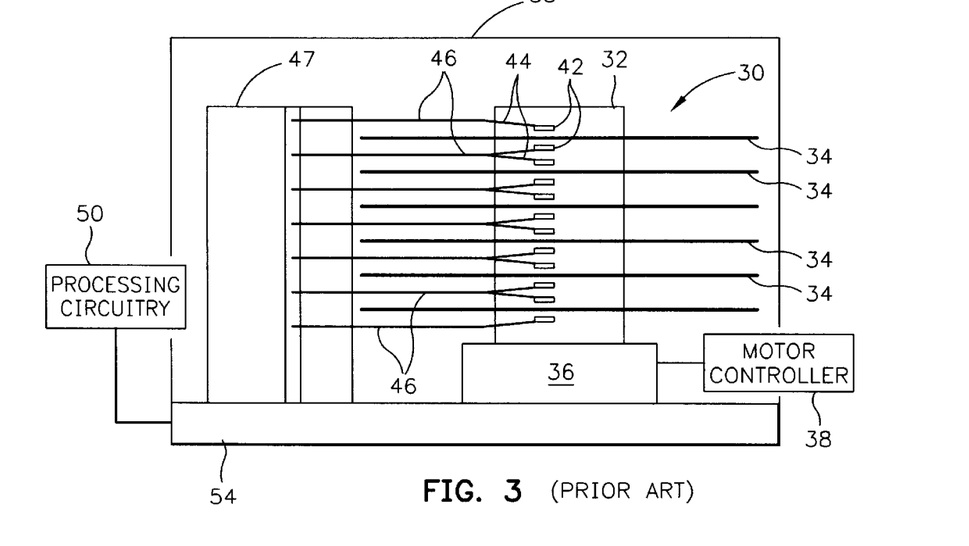
FIG. 3 is an elevation view of the magnetic disk drive wherein multiple disks and magnetic heads are employed.
Figure 4:
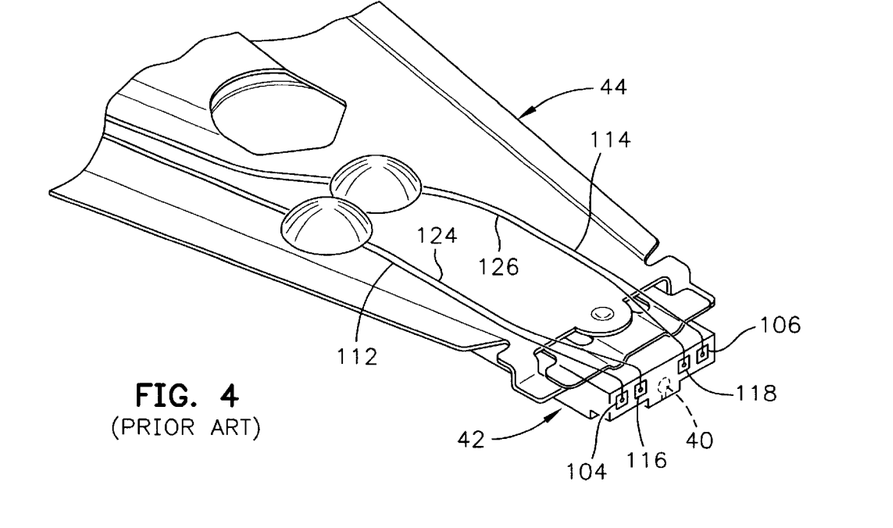
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
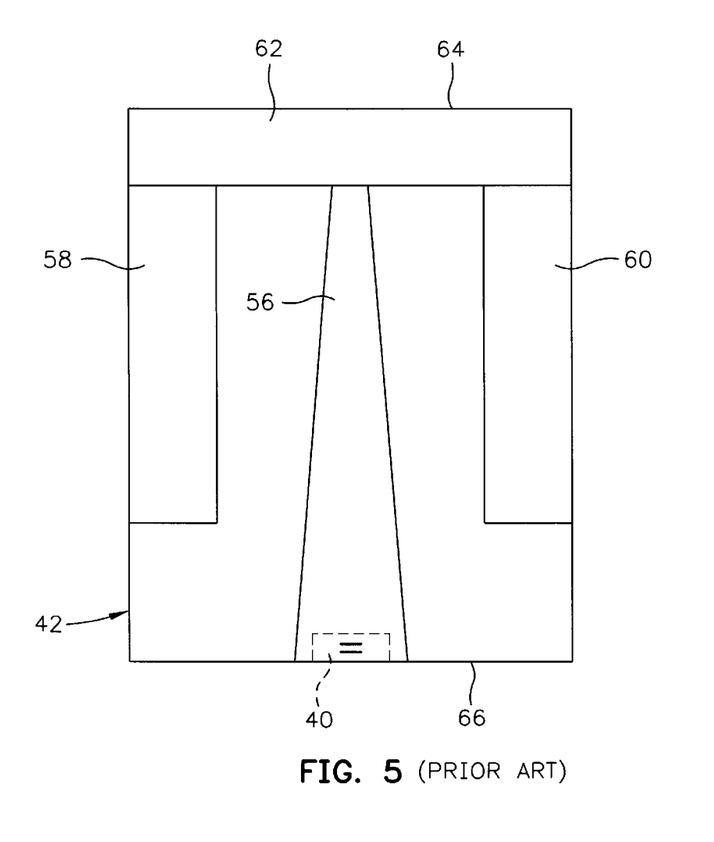
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
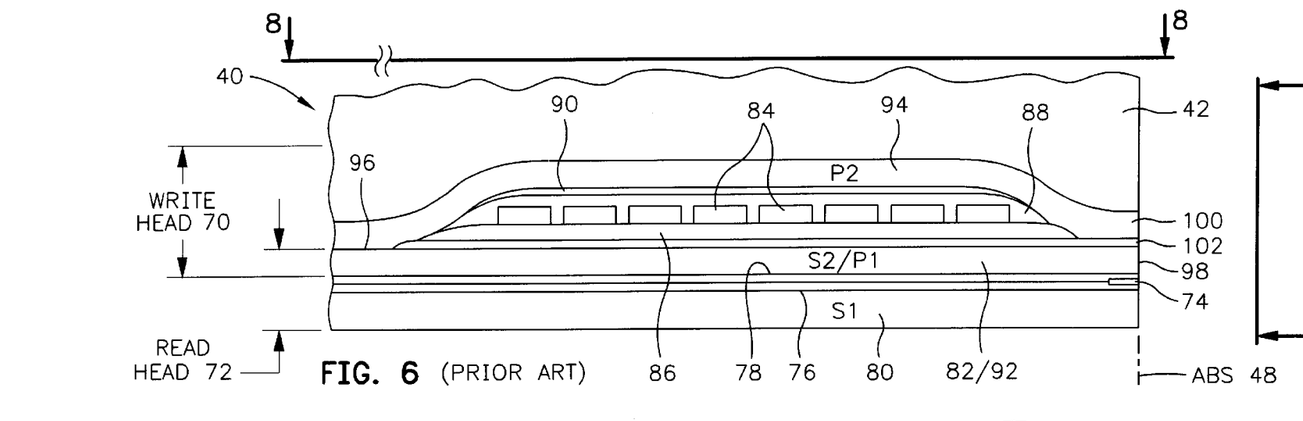
FIG. 6 is a partial view of the slider and a merged magnetic head as seen in plane 6—6 of FIG. 2.
Figure 7:
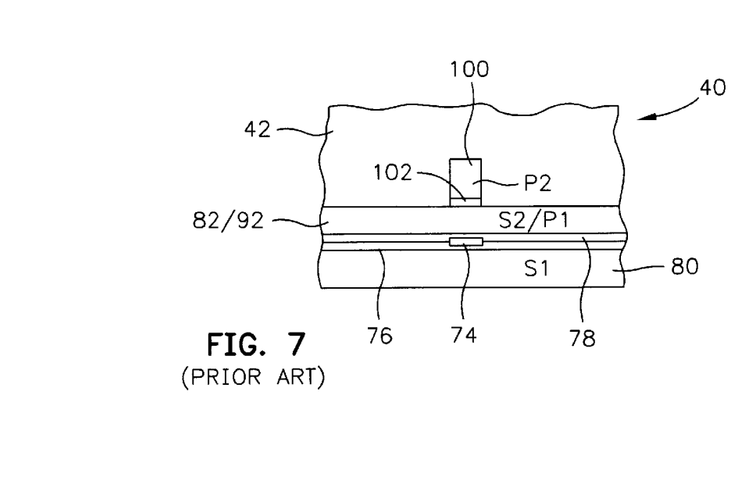
FIG. 7 is a partial ABS view of the slider taken along plane 7—7 of FIG. 6 to show the read and write elements of the magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 8:
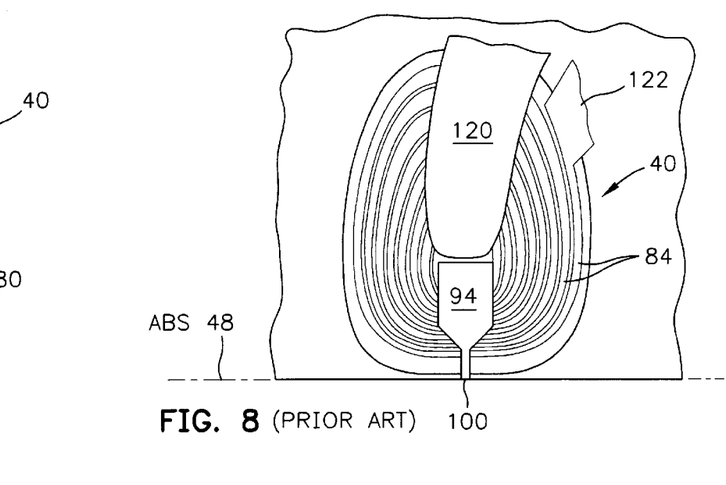
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
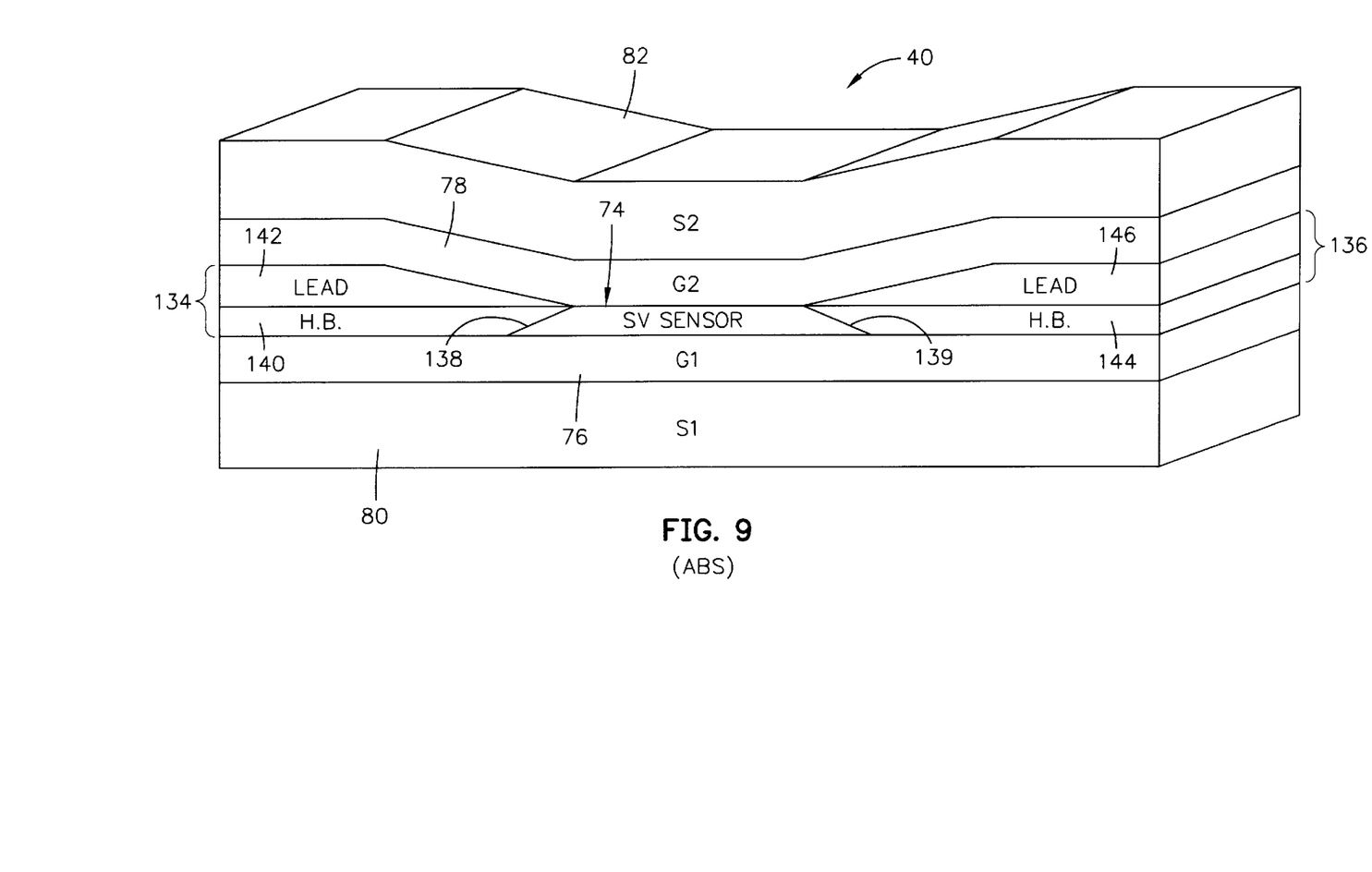
FIG. 9 is an enlarged isometric illustration of the read head with a spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 10:
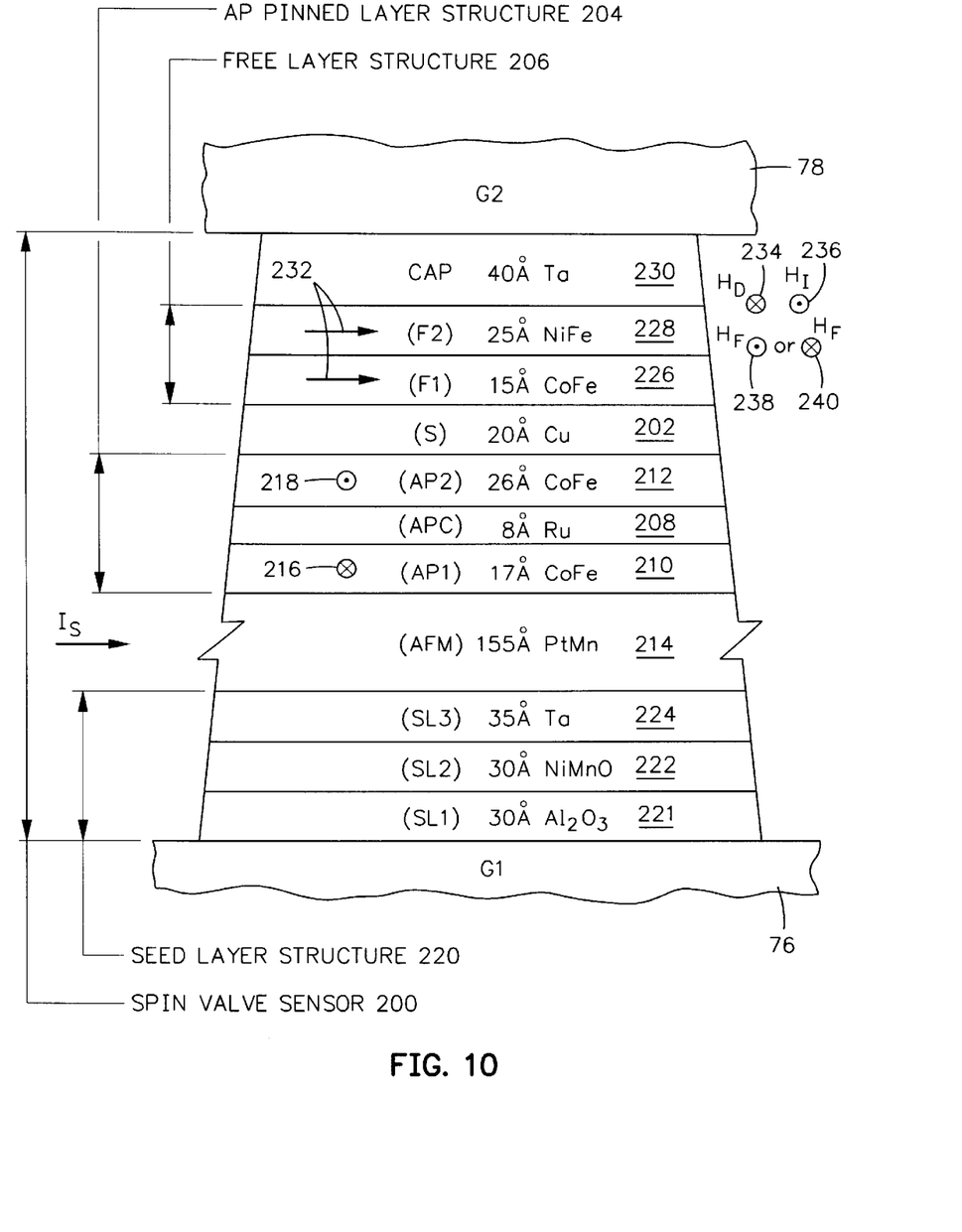
FIG. 10 is an ABS illustration of a first embodiment of the present spin valve sensor.
Figure 11:
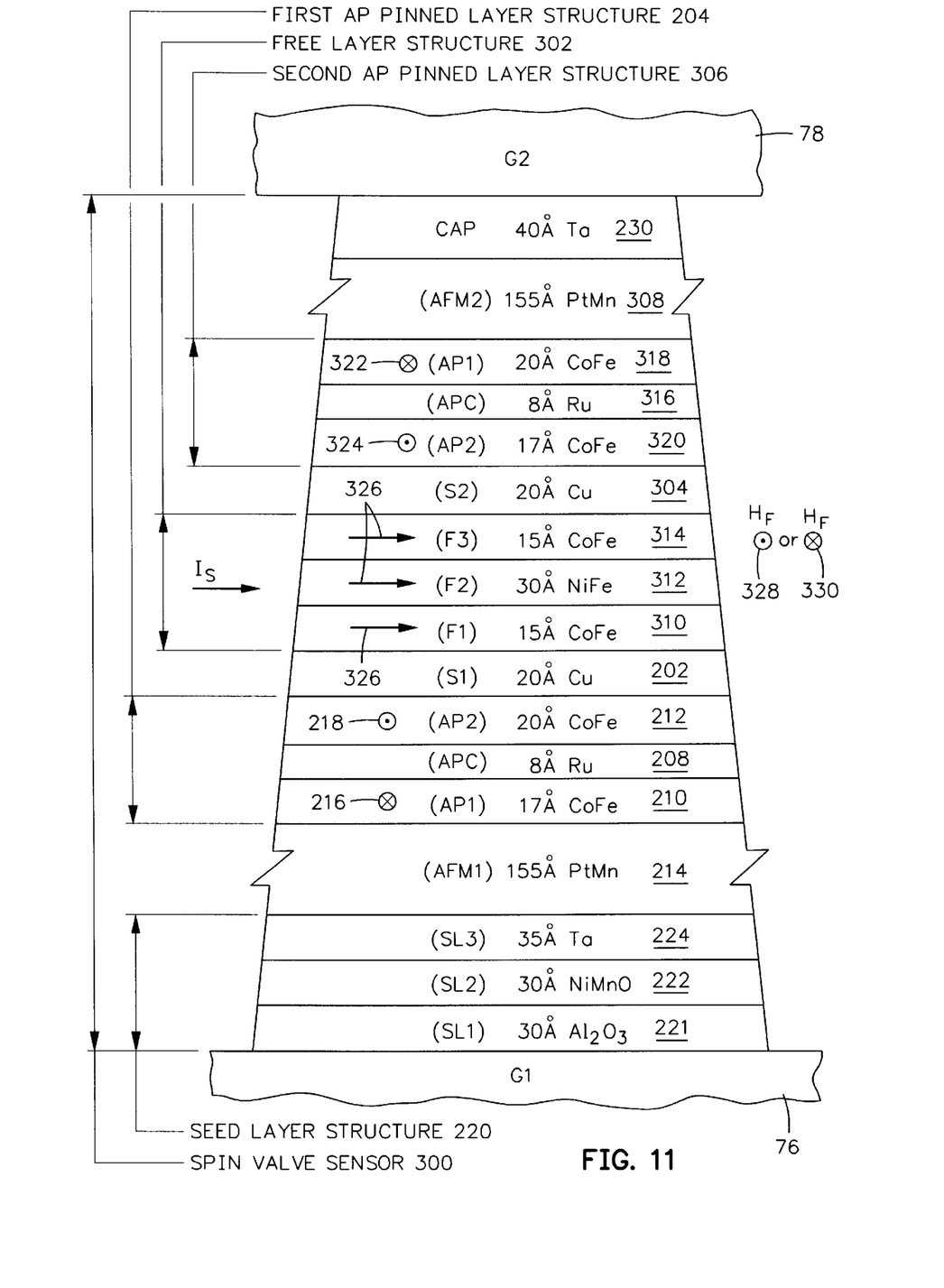
FIG. 11 is an ABS illustration of the second embodiment of the present spin valve sensor.

FIGS. 10 and 11 are ABS illustrations of spin valve sensors which were tested according to the present invention, as discussed in detail hereinafter. The spin valve sensors can be substituted for the spin valve sensor 74 shown in FIG. 9. In FIG. 10 a single spin valve sensor 200 is shown between the first and second read gap layers 76 and 78. The spin valve sensor includes a nonmagnetic electrically nonconductive spacer layer (S) 202 which is located between an antiparallel (AP) pinned layer structure 204 and a free layer structure 206. The AP pinned layer structure 204 includes an antiparallel coupling (APC) layer 208 which is located between first and second antiparallel (AP) pinned layers (AP1) and (AP2) 210 and 212. The first AP pinned layer 210 is exchange coupled to an antiferromagnetic (AFM) pinning layer 214 which pins a magnetic moment 216 of the first AP pinned layer perpendicular to the ABS in a direction out of the sensor or into the sensor, as shown in FIG. 10. By a strong antiparallel coupling between the first and second AP pinned layers 210 and 212, a magnetic moment 218 of the second AP pinned layer is antiparallel to the magnetic moment 216. A seed layer structure 220 may be provided between the first read gap layer 76 and the pinning layer 214 for promoting a desirable microstructure of the layers deposited thereon. The seed layer structure 220 may include first, second and third seed layers (S1), (S2) and (S3) 221, 222 and 224, which will be discussed in more detail hereinafter.

The free layer structure preferably includes first and second free layers (F1) and (F2) 226 and 228 and a cap layer 230 may be located on the free layer structure for protecting the spin valve sensor from subsequent processing steps. The free layer structure has a magnetic moment 232 which is oriented parallel to the ABS and to the major planes of the layers in a direction from right to left or from left to right, as shown in FIG. 10. When a signal field from the rotating magnetic disk rotates the magnetic moment 232 of the free layer into the sensor the magnetic moments 232 and 218 become more antiparallel which increases the resistance of the sensor to the sense current $I_S$, and when the signal field from the rotating magnetic disk rotates the magnetic moment 232 out of the sensor the magnetic moments 232 and 218 become more parallel which reduces the resistance of the sensor to the sense current $I_S$. These resistance changes are processed as playback signals by the processing circuitry 50 in FIG. 3.

The thicknesses and materials of the layers for the examples of the experiments, which will be discussed hereinafter, are 30 Å of aluminum oxide for the first seed layer 221, 30 Å of nickel manganese oxide for the second seed layer 222, 35 Å of tantalum for the third seed layer 224, 155 Å of platinum manganese for the pinning layer 214, 17 Å of cobalt iron for the first AP pinned layer 210, 8 Å of ruthenium for the antiparallel coupling layer 208, 26 Å of cobalt iron for the second AP pinned layer 212, 20 Å of copper for the spacer layer 202, 15 Å of cobalt iron for the first free layer 226, 25 Å of nickel iron for the second free layer 228 and 40 Å of tantalum for the cap layer 230.

As a result of the second AP pinned layer 212 being greater than the thickness of the first AP pinned layer 210, there is a net demagnetizing field ($H_D$) 234 acting on the free layer structure into the paper, and because of the sense current $I_S$ there is a sense current field ($H_I$) 236 acting on the free layer structure out of the paper. Accordingly, these fields 234 and 236 are antiparallel with respect to each other. Also, there is a ferromagnetic coupling field ($H_F$) between the second AP pinned layer 212 and the free layer structure 206 which can be a positive ferromagnetic coupling field ($H_F$) 238 or a negative ferromagnetic coupling field ($H_F$) 240. All of these fields should be balanced so that the orientation of the magnetic moment 232 of the free layer structure is parallel to the ABS and the major planes of the layers.

A dual AP pinned spin valve sensor 300 is shown in FIG. 11 and is the same as the spin valve sensor 200, shown in FIG. 10, except for the free layer structure 302, a second copper spacer layer 304, a second AP pinned layer structure 306, a second antiferromagnetic (AFM2) pinning layer 308 and the second AP pinned layer 212 being 20 Å thick instead of 26 Å thick. The free layer structure 302 is located between the first and second spacer layers (S1) and (S2) 202 and 304 and the first and second spacer layers 202 and 304 are located between the first and second AP pinned layer structures 204 and 306. The free layer structure 302 includes first, second and third free layers (F1), (F2) and (F3) 310, 312 and 314 with the second free layer 312 being located between the first and third free layers 310 and 314.

The second AP pinned layer structure 306 includes an antiparallel coupling (APC) 316 which is located between first and second AP pinned layers (AP1) and (AP2) 318 and 320. The first AP pinned layer 318 is exchange coupled to the second pinning layer 308 so that a magnetic moment 322 of the first AP pinned layer is oriented perpendicular to the ABS in a direction into the sensor. By a strong antiparallel coupling between the first and second AP pinned layers 18 and 320, a magnetic moment 324 of the second AP pinned layer is antiparallel to the magnetic moment 322.

The free layer structure has a magnetic moment 326 which is oriented parallel to the ABS and to the major planes of the layers. When a signal field from a rotating magnetic disk rotates the magnetic moment 326 into the sensor the magnetic moment 326 becomes more antiparallel with respect to the magnetic moments 218 and 324, which increases resistance of the sensor to the sense current $I_S$, and when the signal field from the rotating magnetic disk rotates the magnetic moment 326 out of the sensor the magnetic moment 326 becomes more parallel with respect to the magnetic moments 218 and 324, which decreases the resistance of the sensor to the sense current $I_S$. Again, these resistance changes are processed by the processing circuitry 50 in FIG. 3 as playback signals. The magnetoresistive coefficient dr/R of the dual AP spin valve sensor in FIG. 11 is about 1.5 times as great as the magnetoresistive coefficient dr/R of the single AP pinned layer structure in FIG. 10.

The thicknesses and materials of the layers not already discussed are 15 Å of cobalt iron for the first free layer 310, 30 Å of nickel iron for the second free layer 312, 15 Å of cobalt iron for the third free layer 314, 20 Å of copper for the second spacer layer 304, 17 Å of cobalt iron for the second AP pinned layer 320, 8 Å of ruthenium for the antiparallel coupling layer 316, 20 Å of cobalt iron for the first AP pinned layer 318 and 155 Å of platinum manganese for the second pinning layer 308. The net demagnetizing field 234, shown in FIG. 10, is not shown in FIG. 11 because the net demagnetizing field of the first and second AP pinned layer structures 204 and 306 is essentially zero. Further, the sense current field ($H_I$) 236 in FIG. 10 is not shown in FIG. 11 since it is essentially zero due to virtually the same amount of conductive material on each side of the free layer structure 302. The spin valve sensor 300 is preferably located between the first and second read gap layers 76 and 78 without an offset so as to provide adequate material in the first and second read gap layers to prevent shorting between lead layers to the sensor and the first and second shield layers. Accordingly, there is no net image current field ($H_{IM}$) acting on the free layer structure. The only remaining field acting on the free layer structure is the ferromagnetic coupling field ($H_F$) which can be positive, as shown at 328, or negative, as shown at 330. It is important that the ferromagnetic coupling field ($H_F$) be set at a proper level so that the magnetic moment 326 of the free layer structure is essentially parallel to the ABS and the major planes of the layers. A desirable level for the ferromagnetic coupling field ($H_F$) is between 0 to −10 Oe. Prior art sputtering techniques make it very difficult to obtain a ferromagnetic coupling field within this range.

The Invention

Example 1

Figure 12:
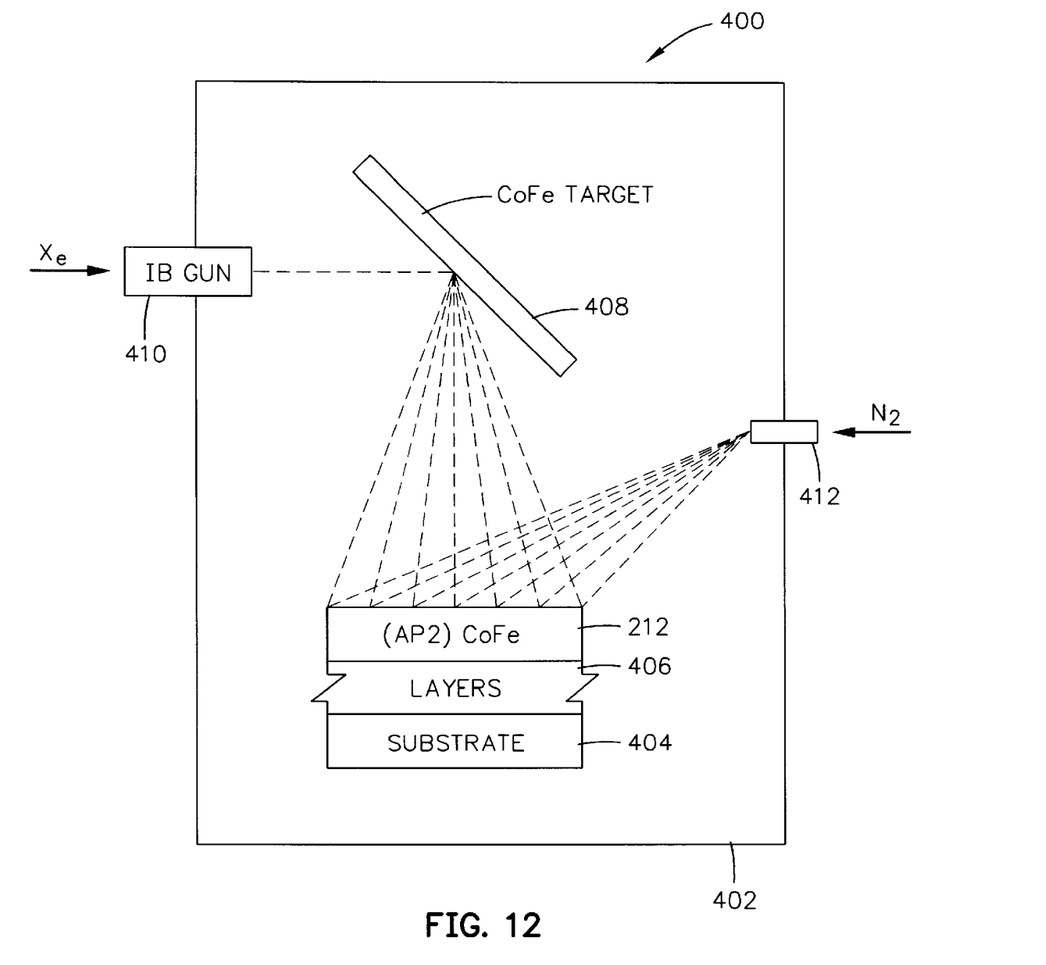
FIG. 12 is a schematic illustration of an ion beam sputtering system wherein the cobalt iron pinned layer structure is sputter deposited in a nitrogen ($N_2$) atmosphere.

In this example the spin valve sensor 300 in FIG. 11 was fabricated with the second AP pinned layer 212 being formed by ion beam sputtering in a sputtering chamber which had a nitrogen ($N_2$) atmosphere. A schematic illustration of the sputtering system 400 is shown in FIG. 12 which has a sputtering chamber 402. Located within the sputtering chamber is a substrate 404 upon which layers 406 of the spin valve sensor 300 below the second AP pinned layer 212 have been formed. Also located within the chamber is a cobalt iron (CoFe) target 408. An ion beam (IB) gun 410 projects through the chamber 402 and accelerates xenon (Xe) ions to the target 408 which causes cobalt iron (CoFe) ions to be sputtered from the target 408 to form the second AP pinned layer 212. Simultaneously, nitrogen ($N_2$) is introduced through an opening 412 in the chamber so that the nitrogen reacts with the cobalt iron at the second AP pinned layer 212 to form the second AP pinned layer 212 with an altered microstructure. Partial pressure of the nitrogen ($N_2$) within the chamber was $2 \times 10^{-5}$ Torr. In this first example, nitrogen ($N_2$) was not introduced into the chamber. The deposition time for each of the first and second spacer layers 202 and 304 was 26 seconds. The rate of deposition was 0.77 Å per second which resulted in each of the spacer layers being 20 Å thick. The ferromagnetic coupling field was −20 Oe. The uniaxial anisotropy field ($H_K$) was 10 Oe, the easy axis coercivity ($H_C$) was 10 Oe, the resistance R of the sensor was 13.95 ohms, the magnetoresistive coefficient dr/R was 10.55 and the magnetostriction (lambda) was $0.8 \times 10^{-6}$.

Example 2

This example is the same as Example 1 except the deposition time of each of the first and second spacer layers 202 and 304 was 25 seconds instead of 26 seconds. The spacer layers were slightly thinner and the ferromagnetic coupling field ($H_F$) was +10 Oe. Examples 1 and 2 show that with only a change of 1 second of deposition time that the ferromagnetic coupling field went from −20 Oe to +10 Oe which is a difference of 30 Oe. This demonstrates that it is very difficult to control the ferromagnetic coupling field because of process variations in the ion beam sputtering system shown in FIG. 12. The uniaxial anisotropy field ($H_K$) was 10 Oe, the easy axis coercivity ($H_C$) was 12 Oe, the resistance R was 13.77 ohms, the magnetoresistive coefficient dr/R was 10.95 and the magnetostriction was $0.2 \times 10^{-6}$.

Example 3

This example is the same as Example 1 except nitrogen ($N_2$) is introduced into the chamber simultaneously with sputtering cobalt iron (CoFe) from the target 408. The result is that the second AP pinned layer 212 is formed of cobalt iron (CoFe) with an altered microstructure which is very important to the operation of the present invention. In this example, the ferromagnetic coupling field was only −5 Oe which is within the desirable range of 0 Oe to −10 Oe. In the present example, the uniaxial anisotropy ($H_K$) was 10 Oe, the easy axis coercivity ($H_C$) was 10 Oe, the magnetostriction (λ) was $0.5 \times 10_{-6}$, the resistance R was 13.9 ohms and the magnetoresistive coefficient dr/R was 10.5.

Example 4

In this example, the spin valve sensor 200 in FIG. 10 was tested. The second AP pinned layer 212 was ion beam sputter deposited in the chamber 400 in FIG. 12 without introducing nitrogen ($N_2$). The ferromagnetic coupling field ($H_F$) was −7 Oe. The uniaxial anisotropy ($H_K$) was 12 Oe, the easy axis coercivity ($H_C$) was 7.6 Oe, the resistance R was 24 ohms, the magnetoresistive coefficient dr/R was 7.8 and the magnetostriction was $0.6 \times 10^{-6}$.

Example 5

This example is the same as Example 4 except the second AP pinned layer 212 was ion beam sputter deposited in the chamber 402 in FIG. 12 simultaneously with the introduction of nitrogen ($N_2$) through the opening 412. The result is that the second AP pinned layer 212 was formed with an altered microstructure which is a basis of the present invention. In both examples, the deposition time for the copper spacer layer 202 was kept constant at 26 seconds. The result in this example was the ferromagnetic coupling field ($H_F$) was 1 Oe. It can be seen that with the present process that the ferromagnetic coupling field is made more positive by 8 Oe in a similar manner as shown by Example 3 for the dual AP pinned spin valve sensor. In this example the uniaxial anisotropy ($H_K$) was 8 Oe, the easy axis coercivity ($H_C$) was 6.3 Oe, the resistance R was 23.6 ohms, the magnetoresistive coefficient dr/R was 7.7 and the magnetostriction was $1.5 \times 10^{-6}$. It can be seen when compared to the fourth example that the uniaxial anisotropy ($H_K$) has been reduced by one-third which makes the free layer structure 206 more responsive to field signals from the rotating magnetic disk.

Other Examples

Figure 13:
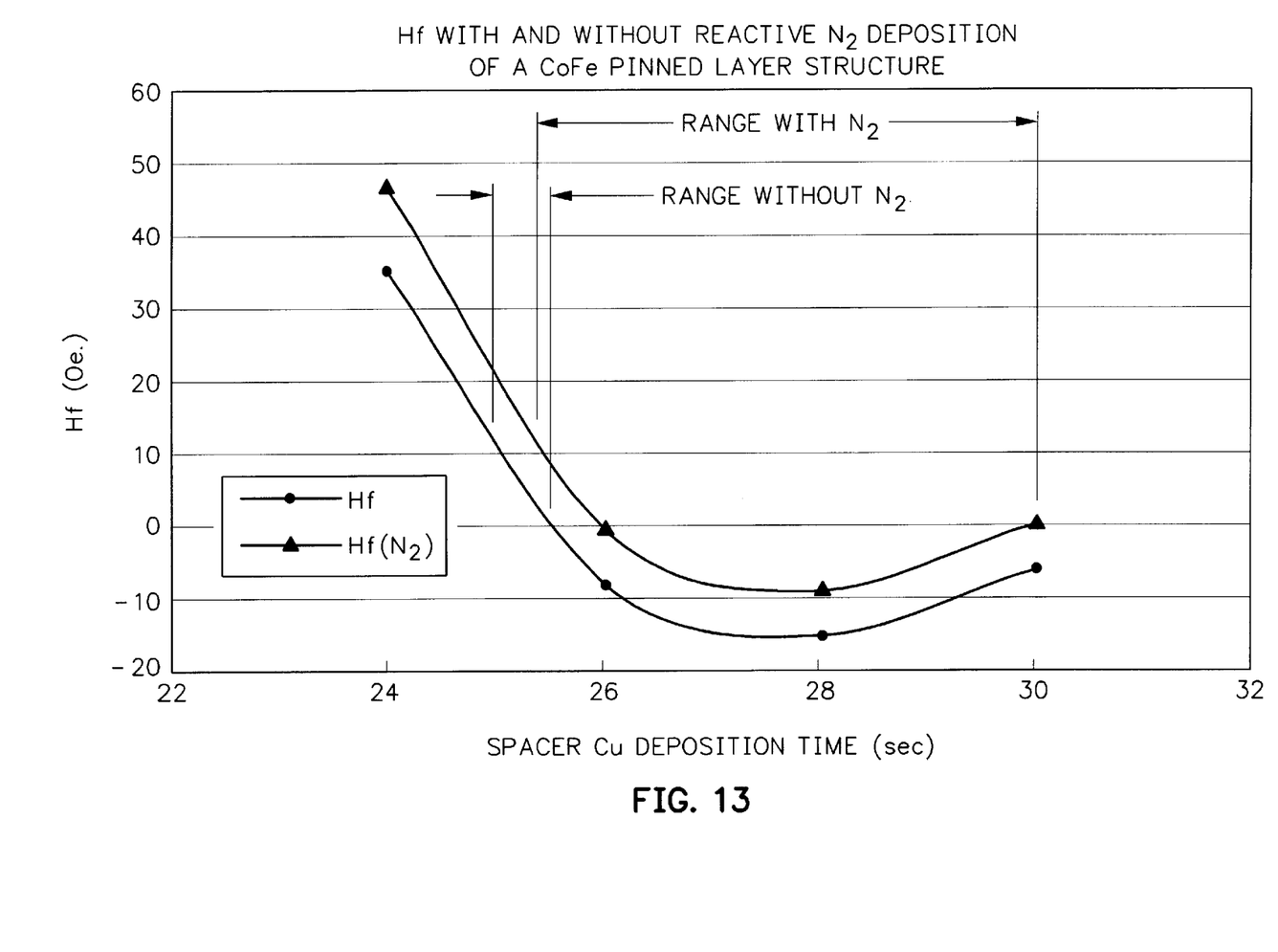
FIG. 13 is a graph illustrating the ferromagnetic coupling field ($H_F$) with and without reactive nitrogen ($N_2$) deposition of a cobalt iron (CoFe) pinned layer structure.

Other examples are shown in the graph in FIG. 13 which tested a dual AP pinned spin valve sensor as shown in FIG. 11. Four different deposition times are shown of the first spacer layer without the introduction of nitrogen ($N_2$) and the same four deposition times are shown with the introduction of nitrogen ($N_2$) when the cobalt iron (CoFe) pinned layer structure is formed. As stated hereinabove, a desirable range for the ferromagnetic coupling field ($H_F$) is from 0 to −10 Oe. It can be seen that the acceptable deposition times for the copper spacer layer where nitrogen is not employed to fabricate the cobalt iron (CoFe) pinned layer structure is only between 25 seconds to 25.5 seconds. However, when nitrogen ($N_2$) is employed in the sputtering chamber while simultaneously depositing the cobalt iron pinned layer structure an acceptable ferromagnetic coupling field ($H_F$) can be obtained when the copper deposition time is from about 25.5 second to 30 seconds. This is a range of about 4.5 seconds which is 9 times greater than the range without the nitrogen ($N_2$) atmosphere. Accordingly, the present invention enables the desirable range of ferromagnetic coupling fields ($H_F$) to be obtained with the ion beam sputtering system shown in FIG. 12.

Discussion

It should be understood that cobalt (Co) or any cobalt based alloy may be substituted for cobalt iron (CoFe) without departing from the spirit of the invention.

Further, it should be understood that the nitrogen ($N_2$) atmosphere changes the microstructure (grain size) of the pinned layer structure by interstitially introducing nitrogen between the atoms of the thin film. The cobalt, cobalt based alloy or nickel iron has a changed crystalline structure which changes the ferromagnetic coupling field ($H_C$).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic read head which has an air bearing surface (ABS), comprising the steps of:
   a making of the spin valve sensor comprising the steps of:
       forming a ferromagnetic first pinned layer structure that has a magnetic moment;

forming an antiferromagnetic first pinning layer exchange coupled to the first pinned layer structure for pinning the magnetic moment of the first pinned layer structure;

forming a ferromagnetic free layer structure;

forming a nonmagnetic electrically conductive first spacer layer between the free layer structure and the first pinned layer structure; and forming the first pinned layer structure by sputter deposition of cobalt (Co) or a cobalt based alloy in a nitrogen ($N_2$) atmosphere.

2. A method as claimed in claim 1 including the steps of:

forming nonmagnetic electrically nonconductive first and second read gap layers;

forming the spin valve sensor between the first and second read gap layers;

forming ferromagnetic first and second shield layers; and forming the first and second read gap layers between the first and second shield layers.

3. A method as claimed in claim 2 wherein the cobalt based alloy is cobalt iron (CoFe).

4. A method as claimed in claim 3 wherein the sputter deposition is ion beam sputtering with a nitrogen partial pressure of $2 \times 10^{-5}$ Torr.

5. A method of making a magnetic read head which has an air bearing surface (ABS), comprising the steps of:

forming nonmagnetic electrically nonconductive first and second read gap layers;

forming a spin valve sensor between the first and second read gap layers;

forming ferromagnetic first and second shield layers;

forming the first and second read gap layers between the first and second shield layers;

a making of the spin valve sensor comprising the steps of:

forming a ferromagnetic first pinned layer structure that has a magnetic moment;

forming an antiferromagnetic first pinning layer exchange coupled to the first pinned layer structure for pinning the magnetic moment of the first pinned layer structure;

forming a ferromagnetic free layer structure;

forming a nonmagnetic electrically conductive first spacer layer between the free layer structure and the first pinned layer structure;

forming the first pinned layer structure by sputter deposition of cobalt (Co) or a cobalt based alloy in a nitrogen ($N_2$) atmosphere; and forming a ferromagnetic second pinned layer structure and a nonmagnetic second spacer layer with the free layer structure located between the first and second spacer layers and the first and second spacer layers located between the first and second pinned layer structures.

6. A method as claimed in claim 5 wherein each of the first and second pinned layer structures is an antiparallel (AP) pinned layer structure that is made comprising the steps of:

forming ferromagnetic first and second antiparallel (AP) pinned layers with the first AP pinned layer interfacing the pinning layer and the second AP pinned layer interfacing the spacer layer;

forming an antiparallel (AP) coupling layer between and interfacing the first and second AP pinned layers; and forming the second AP pinned layer of the first pinned layer structure by said sputter deposition of cobalt iron (CoFe) in a nitrogen ($N_2$) atmosphere.

7. A method as claimed in claim 6 including the steps of:

each of the first and second spacer layers being formed of copper (Cu) with a thickness from 19 Å and 23 Å; and forming the spin valve sensor with a ferromagnetic coupling field ($H_F$) from 0 Oe to −10 Oe.

8. A method as claimed in claim 7 wherein the sputter deposition is ion beam sputtering with a nitrogen partial pressure of $2 \times 10_{-5}$ Torr.

9. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and second pole piece layers at said back gap region;

making a read head including the steps of:

forming nonmagnetic electrically nonconductive first and second read gap layers;

forming a spin valve sensor between the first and second read gap layers; and forming the first and second read gap layers between the first shield layer and the first pole piece layer;

a making of the spin valve sensor comprising the steps of:

forming a ferromagnetic first pinned layer structure that has a magnetic moment;

forming an antiferromagnetic first pinning layer exchange coupled to the first pinned layer structure for pinning the magnetic moment of the first pinned layer structure;

forming a ferromagnetic free layer structure;

forming a nonmagnetic electrically conductive first spacer layer between the free layer structure and the first pinned layer structure; and forming the first pinned layer structure by sputter deposition of cobalt (Co) or a cobalt based alloy in a nitrogen ($N_2$) atmosphere.

10. A method as claimed in claim 9 wherein the cobalt based alloy is cobalt iron (CoFe).

11. A method as claimed in claim 10 wherein the sputter deposition is ion beam sputtering with a nitrogen partial pressure of $2 \times 10^{-5}$ Torr.

12. A method of making magnetic head assembly that has an air bearing surface (ABSV), comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and second pole piece layers at said back gap region;:

making a read head including the steps of:

forming nonmagnetic electrically nonconductive first and second read gap layers;

forming a spin valve sensor between the first and second read gap layers; and forming the first and second read gap layers between the first shield layer and the first pole piece layer;

a making of the spin valve sensor comprising the steps of:

forming a ferromagnetic first pinned layer structure that has a magnetic moment;

forming an antiferromagnetic first pinning layer exchange coupled to the first pinned layer structure for pinning the magnetic moment of the first pinned layer structure;

forming a ferromagnetic free layer structure;

forming a nonmagnetic electrically conductive first spacer layer between the free layer structure and the first pinned layer structure;

forming the first pinned layer structure by sputter deposition of cobalt (Co) or a cobalt based alloy in a nitrogen ($N_2$) atmosphere; and forming a ferromagnetic second pinned layer structure and a nonmagnetic second spacer layer with the free layer structure located between the first and second spacer layers and the first and second spacer layers located between the first and second pinned layer structures.

13. A method as claimed in claim 12 wherein each of the first and second pinned layer structure is an antiparallel (AP) pinned layer structure that is made comprising the steps of:

forming ferromagnetic first and second antiparallel (AP) pinned layers with the first AP pinned layer interfacing the pinning layer and the second AP pinned layer interfacing the spacer layer;

forming an antiparallel (AP) coupling layer between and interfacing the first and second AP pinned layers; and forming the second AP pinned layer of the first pinned layer structure by said sputter deposition of cobalt iron (CoFe) in a nitrogen ($N_2$) atmosphere.

14. A method as claimed in claim 13 including the steps of:

each of the first and second spacer layers being formed of copper (Cu) with a thickness from 19 Å and 23 Å; and forming the spin valve sensor with a ferromagnetic coupling field ($H_F$) from 0 Oe to −10 Oe.

15. A method as claimed in claim 14 wherein the sputter deposition is ion beam sputtering with a nitrogen partial pressure of $2\times10^{-5}$ Torr.

16. A magnetic read head which has an air bearing surface (ABS), comprising:

a spin valve sensor including:

a ferromagnetic first pinned layer structure that has a magnetic moment;

an antiferromagnetic first pinning layer exchange coupled to the first pinned layer structure for pinning the magnetic moment of the first pinned layer structure;

a ferromagnetic free layer structure;

a nonmagnetic electrically conductive first spacer layer located between the free layer structure and the first pinned layer structure; and the first pinned layer structure having been formed by sputter deposition of cobalt (Co) or a cobalt based alloy in a nitrogen ($N_2$) atmosphere.

17. A magnetic read head as claimed in claim 16 including:

nonmagnetic electrically nonconductive first and second read gap layers;

the spin valve sensor being located between the first and second read gap layers;

ferromagnetic first and second shield layers; and the first and second read gap layers being located between the first and second shield layers.

18. A magnetic read head as claimed in claim 16 wherein the cobalt based alloy is cobalt iron (CoFe).

19. A magnetic read head as claimed in claim 18 wherein the sputter deposition is ion beam sputtering with a nitrogen partial pressure of $2\times10^{-5}$ Torr.

20. A magnetic read head which has an air bearing surface (ABS), comprising:

nonmagnetic electrically nonconductive first and second read gap layers;

a spin valve sensor being located between the first and second read gap layers;

ferromagnetic first and second shield layers; and the first and second read gap layers being located between the first and second shield layers;

the spin valve sensor including:

a ferromagnetic first pinned layer structure that has a magnetic moment;

an antiferromagnetic first pinning layer exchange coupled to the first pinned layer structure for pinning the magnetic moment of the first pinned layer structure;

a ferromagnetic free layer structure;

a nonmagnetic electrically conductive first spacer layer located between the free layer structure and the first pinned layer structure;

the first pinned layer structure having been formed by sputter deposition of cobalt (Co) or a cobalt based alloy in a nitrogen ($N_2$) atmosphere;

a ferromagnetic second pinned layer structure and a nonmagnetic second spacer layer; and the free layer structure being located between the first and second spacer layers and the first and second spacer layers being located between the first and second pinned layer structures.

21. A magnetic read head as claimed in claim 20 wherein each of the first and second pinned layer structures is an antiparallel (AP) pinned layer structure that comprises:

ferromagnetic first and second antiparallel (AP) pinned layers with the first AP pinned layer interfacing the pinning layer and the second AP pinned layer interfacing the spacer layer;

an antiparallel (AP) coupling layer located between and interfacing the first and second AP pinned layers; and the second AP pinned layer of the first pinned layer structure having been formed by said sputter deposition of cobalt iron (CoFe) in a nitrogen ($N_2$) atmosphere.

22. A magnetic read head as claimed in claim 21 including:

each of the first and second spacer layers being composed of copper (Cu) and having a thickness from 19 Å and 23 Å; and the spin valve sensor having a ferromagnetic coupling field ($H_F$) from 0 Oe to −10 Oe.

23. A magnetic read head as claimed in claim 22 wherein the sputter deposition is ion beam sputtering with a nitrogen partial pressure of $2\times10^{-5}$ Torr.

24. A magnetic head assembly having an air bearing surface (ABS), comprising:

a write head including:

ferromagnetic first and second pole piece layers that have a yoke portion located between a pole tip portion and a back gap portion;

a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic electrically nonconductive first and second read gap layers;
the spin valve sensor being located between the first and second read gap layers;
a ferromagnetic first shield layer; and
the first and second gap layers being located between the first shield layer and the first pole piece layer; and
the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a ferromagnetic free layer structure;
a nonmagnetic electrically conductive first spacer layer located between the free layer structure and the first pinned layer structure; and
the first pinned layer structure having been formed by sputter deposition of cobalt (Co) or a cobalt based alloy in a nitrogen ($N_2$) atmosphere.

25. A magnetic head assembly as claimed in claim 24 wherein the cobalt based alloy is cobalt iron (CoFe).

26. A magnetic head assembly as claimed in claim 25 wherein the sputter deposition is ion beam sputtering with a nitrogen partial pressure of $2 \times 10^{-5}$ Torr.

27. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic electrically nonconductive first and second read gap layers;
the spin valve sensor being located between the first and second read gap layers;
a ferromagnetic first shield layer; and
the first and second gap layers being located between the first shield layer and the first pole piece layer; and
the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a ferromagnetic free layer structure;
a nonmagnetic electrically conductive first spacer layer located between the free layer structure and the first pinned layer structure;
the first pinned layer structure having been formed by sputter deposition of cobalt (Co) or a cobalt based alloy in a nitrogen ($N_2$) atmosphere;
a ferromagnetic second pinned layer structure and a nonmagnetic second spacer layer; and
the free layer structure being located between the first and second spacer layers and the first and second spacer layers being located between the first and second pinned layer structures.

28. A magnetic head assembly as claimed in claim 27 wherein each of the first and second pinned layer structures is an antiparallel (AP) pinned layer structure that comprises:
ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer of the first pinned layer structure having been formed by said sputter depositon of cobalt iron (CoFe) in a nitrogen ($N_2$) atmosphere.

29. A magnetic head assembly as claimed in claim 28 including:
each of the first and second spacer layers being composed of copper (Cu) and having a thickness from 19 Å and 23 Å; and
the spin valve sensor having a ferromagnetic coupling field ($H_F$) from 0 Oe to –10 Oe.

30. A magnetic head assembly as claimed in claim 29 wherein the sputter deposition is ion beam sputtering with a nitrogen partial pressure of $2 \times 10^{-5}$ Torr.

31. A magnetic disk drive including at least one magnetic head assembly that has an air bearing surface (ABS) and that includes a write head and a read head, comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a spin valve sensor;
nonmagnetic electrically nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a ferromagnetic free layer structure;
a nonmagnetic electrically conductive first spacer layer located between the free layer structure and the first pinned layer structure; and the first pinned layer structure having been formed by sputter deposition of cobalt (Co) or a cobalt based alloy in a nitrogen ($N_2$) atmosphere;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

32. A magnetic disk drive as claimed in claim 31 wherein the cobalt based alloy is cobalt iron (CoFe).

33. A magnetic disk drive as claimed in claim 32 wherein the sputter deposition is ion beam sputtering with a nitrogen partial pressure of $2\times10^{-5}$ Torr.

34. A magnetic disk drive including at least one magnetic head assembly that has an air bearing surface (ABS) and that includes a write head and a read head, comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and a read head including:
a spin valve sensor;
nonmagnetic electrically nonconductive first and second read gap layers;
the spin valve sensor being located between the first and second read gap layers;
a ferromagnetic first shield layer; and
the first and second read gap layers being located between the first shield layer and the first pole piece layer; and the spin valve sensor including:
a ferromagnetic first pinned layer structure that has a magnetic moment;
an antiferromagnetic first pinning layer exchange coupled to the first pinned layer structure for pinning the magnetic moment of the first pinned layer structure;
a ferromagnetic free layer structure;
a nonmagnetic electrically conductive first spacer layer located between the free layer structure and the first pinned layer structure; and
the first pinned layer structure having been formed by sputter deposition of cobalt (Co) or a cobalt based alloy in a nitrogen ($N_2$) atmosphere;
a ferromagnetic second pinned layer structure and a nonmagnetic second spacer layer;
the free layer structure being located between the first and second spacer layers and the first and second spacer layers being located between the first and second pinned layer structures;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

35. A magnetic disk drive as claimed in claim 34 wherein each of the first and second pinned layer structures is an antiparallel (AP) pinned layer structure that comprises:

ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer of the first pinned layer structure having been formed by said sputter depositon of cobalt iron (CoFe) in a nitrogen ($N_2$) atmosphere.

36. A magnetic disk drive as claimed in claim 35 including:
each of the first and second spacer layers being composed of copper (Cu) and having a thickness from 19 Å and 23 Å; and
the spin valve sensor having a ferromagnetic coupling field ($H_F$) from 0 Oe to −10 Oe.

37. A magnetic disk drive as claimed in claim 36 wherein the sputter deposition is ion beam sputtering with a nitrogen partial pressure of $2\times10^{-5}$ Torr.

* * * * *